US012807181B2

(12) United States Patent
Karagulle et al.

(10) Patent No.: US 12,807,181 B2

(45) Date of Patent: Nov. 24, 2026

(54) DETERMINING A WEIGHT SET TO PERSONALIZE A RULE THAT GOVERNS A MANNER OF A PERFORMANCE OF A CHANGE OF A MOVEMENT OF AN AUTOMATED VEHICLE

(71) Applicants: Toyota Research Institute, Inc., Los Altos, CA (US); The Regents of the University of Michigan, Ann Arbor, MI (US)

(72) Inventors: Ruya Karagulle, Ann Arbor, MI (US); Andrew Best, Sunnyvale, CA (US); Jonathan DeCastro, Arlington, MA (US); Nikos Arechiga Gonzalez, San Mateo, CA (US); Necmiye Ozay, Ann Arbor, MI (US)

(73) Assignees: Toyota Research Institute, Inc., Los Altos, CA (US); Toyota Jidosha Kabushiki Kaisha, Toyota (JP); The Regents of the University of Michigan, Ann Arbor, MI (US)

( * ) Notice: Subject to any disclaimer, the term of this patent is extended or adjusted under 35 U.S.C. 154(b) by 144 days.

(21) Appl. No.: 18/745,177

(22) Filed: Jun. 17, 2024

(65) Prior Publication Data

US 2025/0282382 A1 Sep. 11, 2025

Related U.S. Application Data

(60) Provisional application No. 63/562,910, filed on Mar. 8, 2024.

(51) Int. Cl.

| | |
|---|---|
| ***B60W 60/00*** | (2020.01) |
| ***B60W 50/08*** | (2020.01) |
| *B60W 50/00* | (2006.01) |

(52) U.S. Cl.

CPC ........ *B60W 60/0013* (2020.02); *B60W 50/08* (2013.01); *B60W 2050/0075* (2013.01)

(58) Field of Classification Search

CPC ............. B60W 60/0013; B60W 50/08; B60W 2050/0075

See application file for complete search history.

(56) References Cited

U.S. PATENT DOCUMENTS

| | | | | |
|---|---|---|---|---|
| 12,139,133 | B1 * | 11/2024 | Schleede | B60W 10/18 |
| 2020/0406906 | A1 * | 12/2020 | Omari | G05D 1/0223 |
| 2024/0391502 | A1 * | 11/2024 | Rosman | B60W 60/0027 |

OTHER PUBLICATIONS

Nils Wilde, "Specifying User Preferences for Autonomous Robots Through Interactive Learning," doctoral thesis, University of Waterloo, Ontario, Canada, Sep. 28, 2020, 173 pages, found at https://uwspace.uwaterloo.ca/bitstream/handle/10012/16386/Wilde_Nils.pdf?sequence=3&isAllowed=y.

(Continued)

*Primary Examiner* — Yuen Wong

(74) *Attorney, Agent, or Firm* — Christopher G. Darrow; Darrow Mustafa PC

(57) ABSTRACT

A system for determining a weight for a rule that governs a manner of a performance of a change of a movement of an automated vehicle can determine the weight from responses, from a human subject, to questions about preferences about the manner of the performance. The questions can be selected, using a greedy technique, from a question set. The weight can be applied to the rule to incorporate the preference of the human subject about the manner of the performance. The preference can be with respect to one or more of: (1) a degree of comfort of the human subject during the performance, (2) a degree of vehicle performance of the automated vehicle during the performance, or (3) the like. Such a rule can increase a likelihood that a human driver (i.e., the human subject) will accept having the automated (Continued)

vehicle operated under control of an automated driving system.

20 Claims, 8 Drawing Sheets

(56) References Cited

OTHER PUBLICATIONS

Aly et al., Robotics for People: Perspectives on Interaction, Learning and Safety, Proceedings of full-day workshop at the RSS 2021 conference, 2021, 66 pages, found at https://hal.science/hal-03296937/document.
Wilde et al., "Improving User Specifications for Robot Behavior Through Active Preference Learning: Framework and Evaluation," The International Journal of Robotics Research, 2020, pp. 1-17, found at https://arxiv.org/pdf/1907.10412.
Karagulle et al., "A Safe Preference Learning Approach for Personalization with Applications to Autonomous Vehicles," IEEE Robotics and Automation Letters, vol. 9, No. 5, May 2024, pp. 4226-4233.
Unknown, "Correct by Construction," last accessed on Apr. 17, 2024, 5 pages, found at http://www.esterel-technologies.com/company/overview.html.
Unknown, "Robust and sound?" corp.ling.stats, posted Apr. 4, 2012, 9 pages, found at https://corplingstats.wordpress.com/2012/04/04/robust-and-sound/.
Unknown, "Active learning," last accessed on Mar. 17, 2024, 15 pages, found at https://en.wikipedia.org/wiki/Active_learning.
Unknown, "Active learning (machine learning)" last accessed on Feb. 22, 2024, 6 pages, found at https://en.wikipedia.org/wiki/Active_learning_(machine_learning).
Unknown, "Bayesian optimization," last accessed on Feb. 26, 2024, 5 pages, found at https://en.wikipedia.org/wiki/Bayesian_optimization.
Unknown, "Combinatorial optimization," last accessed on Jan. 26, 2024, 6 pages, found at https://en.wikipedia.org/wiki/Combinatorial_optimization.
Unknown, "Temporal logic," last accessed on Feb. 21, 2024, 10 pages, found at https://en.wikipedia.org/wiki/Temporal_logic.
Unknown, "Greedy Algorithm," 6 pages, last accessed on May 26, 2024, found at https://en.wikipedia.org/wiki/Greedy_algorithm.

* cited by examiner

DETERMINING A WEIGHT SET TO PERSONALIZE A RULE THAT GOVERNS A MANNER OF A PERFORMANCE OF A CHANGE OF A MOVEMENT OF AN AUTOMATED VEHICLE

CROSS-REFERENCE TO RELATED APPLICATIONS

This application claims the benefit of U.S. Provisional Application No. 63/562,910, filed Mar. 8, 2024, which is incorporated herein in its entirety by reference.

TECHNICAL FIELD

The disclosed technologies are directed to determining a weight for a rule that governs a manner of a performance of a change of a movement of an automated vehicle.

BACKGROUND

Driving automation technology can include, for example, an autonomous motion technology system. An autonomous motion technology system can be used to cause a vehicle to move independently in an environment with one or more other vehicles and/or objects. Such an autonomous motion technology system can be arranged to perform functions in stages. Such stages can include, for example, an information acquisition stage, a perception stage, and a control stage. The information acquisition stage can include technologies through which the vehicle can obtain information about the one or more other vehicles and/or objects in the environment of the vehicle and/or information about a location and/or a movement of the vehicle. The perception stage can perform functions on information from the information acquisition stage to produce information that facilitates a better understanding of the environment of the vehicle. The control stage can perform functions on information from the perception stage to produce: (1) a planned trajectory for the vehicle and (2) a control signal to cause the vehicle to move according to the planned trajectory.

SUMMARY

In an embodiment, a system for determining a weight for a rule that governs a manner of a performance of a change of a movement of an automated vehicle can include a processor and a memory. The memory can store a weight determination module, a perception module, a rule production module, and an implementation module. The weight determination module can include instructions that, when executed by the processor, cause the processor to determine from responses, from a human subject, to questions about preferences about the manner of the performance of the change of the movement of the automated vehicle, the weight for the rule. The questions can be selected, using a greedy technique, from a question set. The perception module can include instructions that, when executed by the processor, cause the processor to determine an existence of a reason to cause the change of the movement of the automated vehicle. The rule production module can include instructions that, when executed by the processor, cause the processor to produce the rule, with the weight applied, that governs the manner of the performance of the change of the movement of the automated vehicle. The rule can include: (1) a first subrule for a preference with respect to the manner of the performance of the change of the movement of the automated vehicle and (2) a second subrule for a safety of the manner of the performance of the change of the movement of the automated vehicle. The implementation module can include instructions that, when executed by the processor, cause the change of the movement of the automated vehicle.

In another embodiment, a method for determining a weight for a rule that governs a manner of a performance of a change of a movement of an automated vehicle can include determining, by a processor and from responses, from a human subject, to questions about preferences about the manner of the performance of the change of the movement of the automated vehicle, the weight for the rule. The questions can be selected, using a greedy technique, from a question set. The method can include determining, by the processor, an existence of a reason to cause the change of the movement of the automated vehicle. The method can include producing, by the processor, the rule, with the weight applied, that governs the manner of the performance of the change of the movement of the automated vehicle. The rule can include: (1) a first subrule for a preference with respect to the manner of the performance of the change of the movement of the automated vehicle and (2) a second subrule for a safety of the manner of the performance of the change of the movement of the automated vehicle. The method can include causing, by the processor, the change of the movement of the automated vehicle.

In another embodiment, a non-transitory computer-readable medium for determining a weight for a rule that governs a manner of a performance of a change of a movement of an automated vehicle can include instructions that, when executed by one or more processors, cause the one or more processors to determine, from responses, from a human subject, to questions about preferences about the manner of the performance of the change of the movement of the automated vehicle, the weight for the rule that governs the manner of the performance of the change of the movement of the automated vehicle. The questions can be selected, using a greedy technique, from a question set. The non-transitory computer-readable medium can include instructions that, when executed by the one or more processors, cause the one or more processors to determine an existence of a reason to cause the change of the movement of the automated vehicle. The non-transitory computer-readable medium can include instructions that, when executed by the one or more processors, cause the one or more processors to produce the rule, with the weight applied, that governs the manner of the performance of the change of the movement of the automated vehicle. The rule can include: (1) a first subrule for a preference with respect to the manner of the performance of the change of the movement of the automated vehicle and (2) a second subrule for a safety of the manner of the performance of the change of the movement of the automated vehicle. The non-transitory computer-readable medium can include instructions that, when executed by the one or more processors, cause the one or more processors to cause the change of the movement of the automated vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
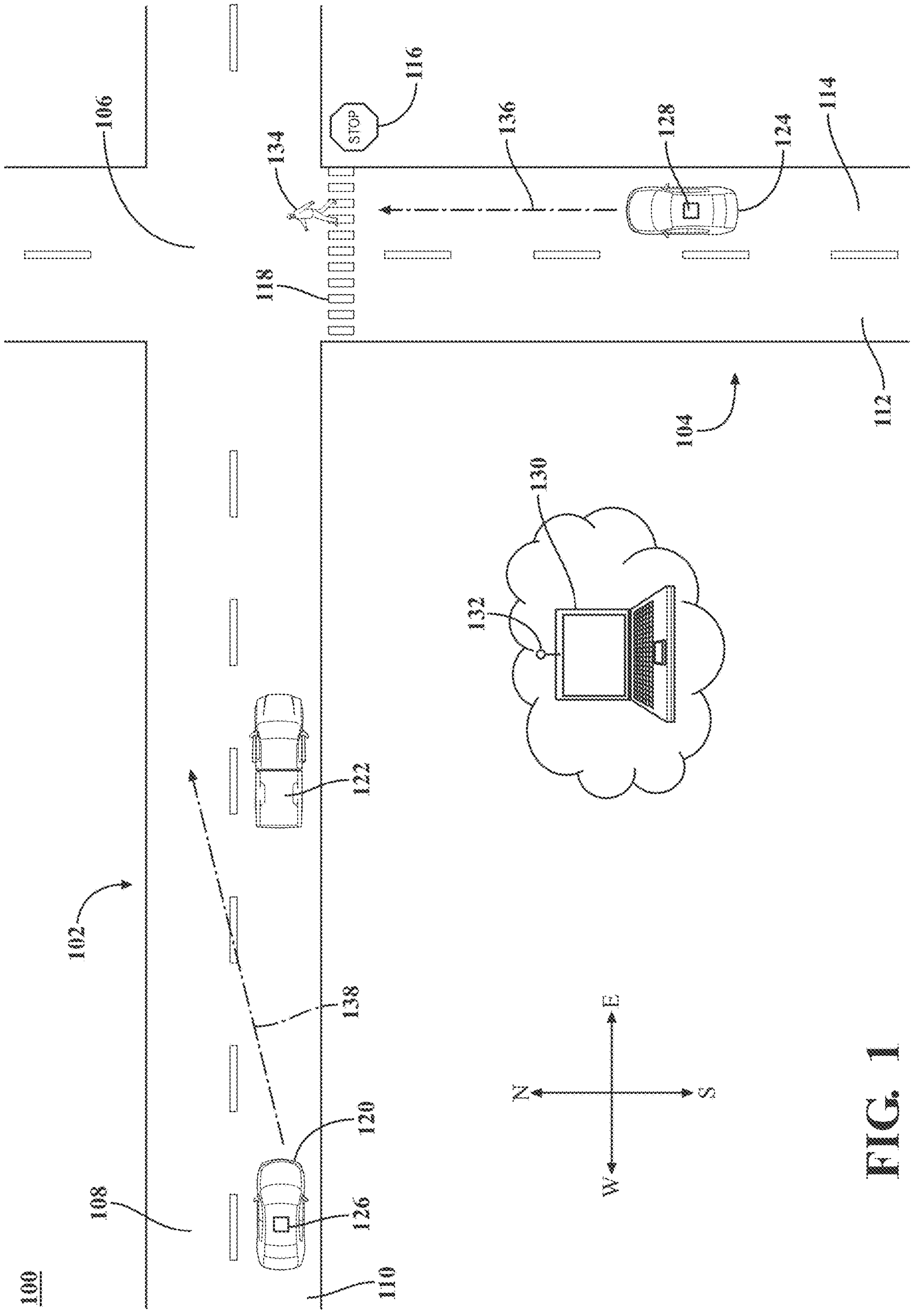
FIG. 1 includes a diagram that illustrates an example of an environment for determining a weight for a rule that governs a manner of a performance of a change of a movement of an automated vehicle, according to the disclosed technologies.

The disclosed technologies are directed to directed to determining a weight for a rule that governs a manner of a performance of a change of a movement of an automated vehicle. For example, the automated vehicle can be an autonomous vehicle. For example, the rule can be expressed using weighted signal temporal logic. The weight for the rule can be determined, from responses, from a human subject, to questions about preferences about the manner of the performance of the change of the movement of the automated vehicle. The questions can be selected, using a greedy technique, from a question set. For example, the greedy technique can be a problem-solving heuristic in which, at each stage of the problem-solving heuristic, a choice of the problem-solving heuristic is a locally optimal choice. That is, for example, because at each stage the choice produced by the greedy technique is the locally optimal choice, the greedy technique may not produce an optimal solution, but can produce, in a reasonable amount of time, locally optimal solutions that approximate a globally optimal solution. An existence of a reason to cause the change of the movement of the automated vehicle can be determined. For example, the existence of the reason to cause the change of the movement of the automated vehicle can be determined after the weight for the rule has been determined. For example, a perception stage of an autonomous motion technology system can determine, from information from an information acquisition stage (e.g., a sensor, a communications device, etc.) of the autonomous motion technology system, the existence of the reason to cause the change of the movement of the automated vehicle. The rule, with the weight applied, that governs the change of the movement of the automated vehicle can be produced. For example, a control stage of the autonomous motion technology system can produce the rule with the weight applied. The rule can include a first subrule and a second subrule. The first subrule can be for a preference with respect to the manner of the performance of the change of the movement of the automated vehicle. For example, the preference can be with respect to one or more of: (1) a degree of comfort of the human subject during the performance of the change of the movement of the automated vehicle, (2) a degree of vehicle performance of the automated vehicle during the performance of the change of the movement of the automated vehicle, or (3) the like. The second subrule can be for a safety of the manner of the performance of the change of the movement of the automated vehicle. The change of the movement of the automated vehicle can be caused to occur. For example, the control stage can cause the change of the movement of the automated vehicle to occur.

The Society of Automotive Engineers (SAE) International has specified various levels of driving automation. Specifically, Standard J3016, Taxonomy and Definitions for Terms Related to Driving Automation Systems for On-Road Motor Vehicles, issued by the SAE International on Jan. 16, 2014, and most recently revised on Apr. 30, 2021, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

Efforts to automate vehicles can be pursued for a variety of reasons. Among such reasons can be a desire to reduce an amount of fuel consumed by a vehicle. For example, it is estimated that by 2050 that autonomous vehicles may reduce consumption of fuel by passenger vehicles by 44 percent, and by trucks by 18 percent. However, realization of such a benefit can depend upon a degree of satisfaction, of a human driver of an automated vehicle, with a manner in which the automated vehicle is operated under a control of an automated driving system. If the human driver is dissatisfied with the manner in which the automated vehicle is operated under the control of the automated driving system, then the human driver may cause control of the automated vehicle to be transferred from the automated driving system to the human driver.

For example, if the human driver is dissatisfied with: (1) a degree of comfort of the human driver during a performance of the change of the movement of the automated vehicle, (2) a degree of vehicle performance of the automated vehicle during the performance of the change of the movement of the automated vehicle, or (3) the like, then the human driver may cause control of the automated vehicle to be transferred from the automated driving system to the human driver. Such a transfer of control of the automated vehicle can undermine, for example, the advantage in reduced consumption of fuel intended to be realized when the automated vehicle is under the driving automation technology system or the likelihood that the human driver will accept having the automated vehicle operated under the control of the automated driving system.

By having a rule that can govern a manner of a performance of a change of a movement of an automated vehicle include: (1) a first subrule and (2) a second subrule in which: (1) the first subrule is for a preference with respect to the manner of the performance of the change of the movement of the automated vehicle, (2) the second subrule is for a safety of the manner of the performance of the change of the movement of the automated vehicle, and (3) a weight, determined from responses, from the human subject, to questions about preferences about the manner of the performance of the change of the movement of the automated vehicle, is applied to the rule, the rule produced by the disclosed technologies can incorporate the preference of the human subject about the manner of the performance of the change of the movement of the automated vehicle while ensuring that the manner of the performance of the change of the movement of the automated vehicle is done safely. Such a rule can increase the likelihood that the human driver (i.e., the human subject) will accept having the automated vehicle operated under the control of the automated driving system.

Returning FIG. 1 includes a diagram 100 that illustrates an example of an environment for determining a weight for a rule that governs a manner of a performance of a change of a movement of an automated vehicle, according to the disclosed technologies. For example, the diagram 100 can include a first road 102 (disposed along a line of latitude) and a second road 104 (disposed along a line of longitude). For example, the diagram 100 can include a road junction 106 (e.g., an intersection) of the first road 102 and the second road 104. For example, the first road 102 can include a westbound lane 108 and an eastbound lane 110. For example, the second road 104 can include a southbound lane 112 and a northbound lane 114. For example, the diagram 100 can include a stop sign 116 at a southeast corner of the road junction 106. For example, the diagram 100 can include a crosswalk 118 disposed across the second road 104 south of the road junction 106. For example, the diagram 100 can include: (1) a first vehicle 120 in the eastbound lane 110 west of the road junction 106, (2) a second vehicle 122 in the eastbound lane 110 west of the road junction 106, but east of the first vehicle 120, and (3) a third vehicle 124 in the northbound lane 114 south of the road junction 106. For example, the first vehicle 120 can have a communications device 126. For example, the third vehicle 124 can have a communications device 128. For example, the diagram 100 can include a computing device 130. For example, the computing device 130 can have a communications device 132. For example, the diagram 100 can include a pedestrian 134 located in the crosswalk 118 in the northbound lane 114.

Figure 2:
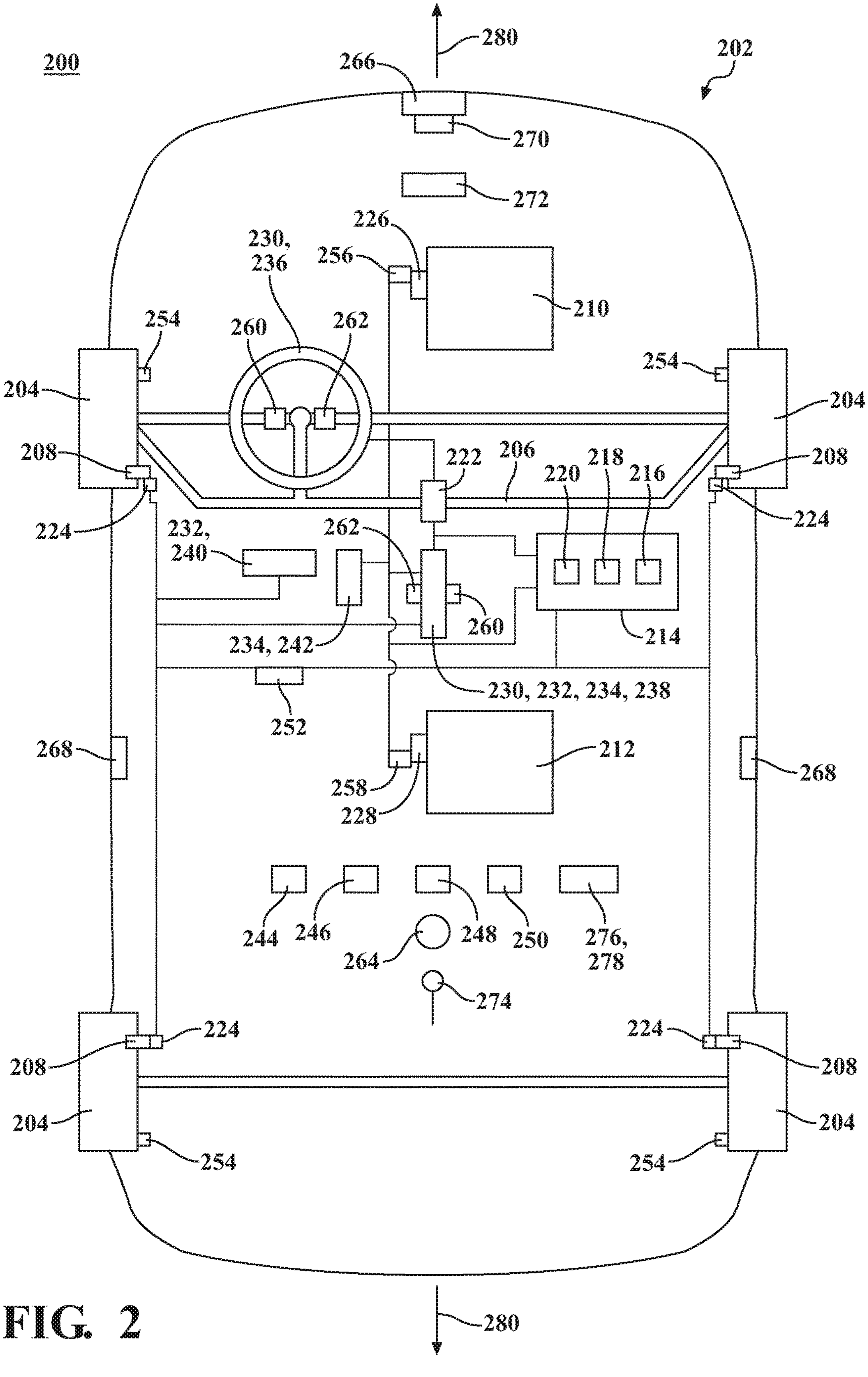
FIG. 2 includes a diagram that illustrates an example of an automated vehicle configured to apply a weight for a rule that governs a manner of a performance of a change of a movement of the automated vehicle, according to the disclosed technologies.

FIG. 2 includes a diagram 200 that illustrates an example of an automated vehicle 202 configured to apply a weight for a rule that governs a manner of a performance of a change of a movement of the automated vehicle 202, according to the disclosed technologies. For example, the automated vehicle 202 can include one or more wheels 204, a steering linkage 206 connected to the one or more wheels 204, one or more brakes 208 for the one or more wheels 204, and at least one of an internal combustion engine 210 or an electric drive motor 212. For example, the automated vehicle 202 can include an autonomous motion technology system 214. For example, the autonomous motion technology system 214 can include an information acquisition stage 216, a perception stage 218, and a control stage 220.

For example, the automated vehicle 202 can include an actuator 222 configured to control the steering linkage 206, one or more actuators 224 configured to control the one or more brakes 208, an actuator 226 configured to control a position of a throttle for the internal combustion engine 210 (e.g., if the automated vehicle 202 is capable of being propelled by the internal combustion engine 210), or an actuator 228 configured to control an amount of current conveyed to the electric drive motor 212 (e.g., if the automated vehicle 202 is capable of being propelled by the electric drive motor 212).

For example, the automated vehicle 202 can include one or more of a steering operator interface 230, a brake operator interface 232, or an acceleration operator interface 234. For example, the steering operator interface 230 can include a steering wheel 236. Alternatively, for example, the steering operator interface 230 can include a joystick-like control lever 238. For example, the braking operator interface 232 can include a brake pedal 240. Alternatively, for example, the braking operator interface 232 can include the joystick-like control lever 238. For example, the accelerating operator interface 234 can include an accelerator pedal 242. Alternatively, for example, the accelerating operator interface 234 can include the joystick-like control lever 238.

For example, the automated vehicle 202 can include one or more of a speedometer 244, an accelerometer 246, a gyroscope 248, a global navigation satellite system (GNSS) 250, a brake pressure sensor 252, a wheel speed sensor 254, a throttle position sensor 256 (e.g., if the automated vehicle 202 is capable of being propelled by the internal combustion engine 210), an electric drive motor ammeter 258 (e.g., if the automated vehicle 202 is capable of being propelled by the electric drive motor 212), a steering operator interface position sensor 260, a steering operator interface applied force sensor 262, or the like.

For example, the automated vehicle 202 can include one or more of a lidar device 264, a radar device 266, an ultrasonic device 268, an infrared device 270, a camera 272, or the like. For example, the ultrasonic device 268 can be an ultrasonic ranging device, an ultrasonic imaging device, or both. For example, the infrared device 270 can be an infrared ranging device, an infrared imaging device, or both. For example, the camera 272 can be one or more of a color camera, a stereoscopic camera, a video camera, a digital video camera, or the like. For example, using one or more imaging devices (e.g., the camera 272), a distance and a bearing to an object can be determined using a photogrammetric range imaging technique (e.g., a structure from motion (SfM) technique) applied to a sequence of two-dimensional images.

For example, the automated vehicle 202 can include a communications device 274.

For example, the automated vehicle 202 can include at least a portion 276 of a system 278 for determining a weight to be applied to a rule that governs a change in a movement of an automated vehicle 202.

For example, the diagram 200 can include a representation of a longitudinal axis 280 of the automated vehicle 202.

With reference to FIGS. 1 and 2, for example, one or more of: (1) the first vehicle 120, (2) the second vehicle 122, or (3) the third vehicle 124 can be the automated vehicle 202.

Figure 3:
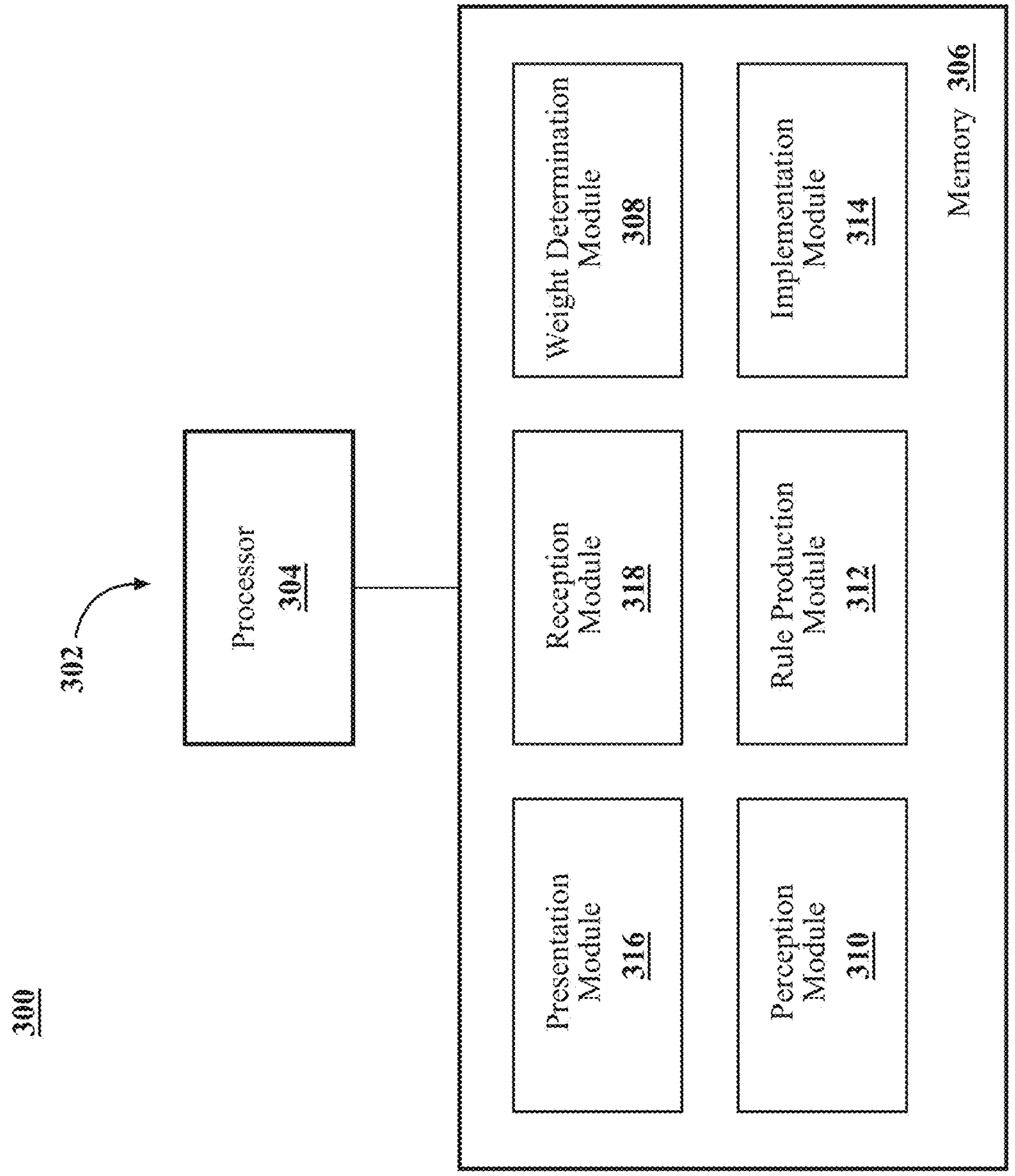
FIG. 3 includes a block diagram that illustrates a first example of a system for determining a weight for a rule that governs a manner of a performance of a change of a movement of an automated vehicle, according to the disclosed technologies.

FIG. 3 includes a block diagram that illustrates a first example 300 of a system 302 for determining a weight for a rule that governs a manner of a performance of a change of a movement of an automated vehicle, according to the disclosed technologies. For example, the automated vehicle can be the automated vehicle 202 illustrated in FIG. 2. The first example 300 of the system 302 can be the system 278 illustrated in FIG. 2. For example, the automated vehicle can be an autonomous vehicle. For example, the rule can be expressed using weighted signal temporal logic. The first example 300 of the system 302 can include a processor 304 and a memory 306. The memory 306 can be communicably coupled to the processor 304. For example, the memory 306 can store a weight determination module 308, a perception module 310, a rule production module 312, and an implementation module 314.

For example, the weight determination module 308 can include instructions that function to control the processor 304 to determine from responses, from a human subject, to questions about preferences about the manner of the performance of the change of the movement of the automated vehicle, the weight for the rule. For example, the questions can be selected, using a greedy technique, from a question set.

For example, the perception module 310 can include instructions that function to control the processor 304 to determine an existence of a reason to cause the change of the movement of the automated vehicle.

For example, the rule production module 312 can include instructions that function to control the processor 304 to produce the rule, with the weight applied, that governs the manner of the performance of the change of the movement of the automated vehicle. For example, the rule can include: (1) a first subrule for a preference with respect to the manner of the performance of the change of the movement of the automated vehicle and (2) a second subrule for a safety of the manner of the performance of the change of the movement of the automated vehicle. For example, the preference can be with respect to one or more of: (1) a degree of comfort of the human subject during the performance of the change of the movement of the automated vehicle, (2) a degree of vehicle performance of the automated vehicle during the performance of the change of the movement of the automated vehicle, or (3) the like.

For example, the implementation module 314 can include instructions that function to control the processor 304 to cause the change of the movement of the automated vehicle.

In an implementation, for example, additionally, the memory 306 can further store a presentation module 316 and a reception module 318. For example, the presentation module 316 can include instructions that function to control the processor 304 to cause the questions to be presented to the human subject. For example, the reception module 318 can include instructions that function to control the processor 304 to cause the processor 304 to receive the responses.

For example: (1) the instructions to cause the questions to be presented to the human subject, (2) the instructions to receive the responses, and (3) the instructions to determine the weight for the rule can be configured to be performed before the human subject causes the automated vehicle to be operated on a public road. That is, for example, in order to increase the likelihood that the human subject (i.e., the human driver) will accept having the automated vehicle operated under the control of the automated driving system, the weight to be applied to the rule, so that the rule produced by the system 302 can incorporate the preference of the human subject about the manner of the performance of the change of the movement of the automated vehicle, can be determined before the human subject causes the automated vehicle to be operated on a public road.

Additionally or alternatively, for example, the implementation module 314 can further include instructions that function to control the processor 304 to cause, before a determination of the weight for the rule, the performance of the change of the movement of the automated vehicle in a specific manner. For example: (1) the instructions to cause the questions to be presented to the human subject, (2) the instructions to receive the responses, and (3) the instructions to determine the weight for the rule can be configured to be performed in response to the performance of the change of the movement of the automated vehicle in the specific manner. That is, for example, the automated vehicle can perform the change of the movement of the automated vehicle in the specific manner. For example, after the performance of the change of the movement of the automated vehicle in the specific manner, a question about a preference of the human subject (i.e., the human driver) about the specific manner of the performance of the change of the movement of the automated vehicle can be presented to the human subject (i.e., the human driver), a response can be received, and the weight for the rule can be determined. For example, such a process can be performed in an iterative manner until a final version of the weight for the rule is determined.

Figure 4:
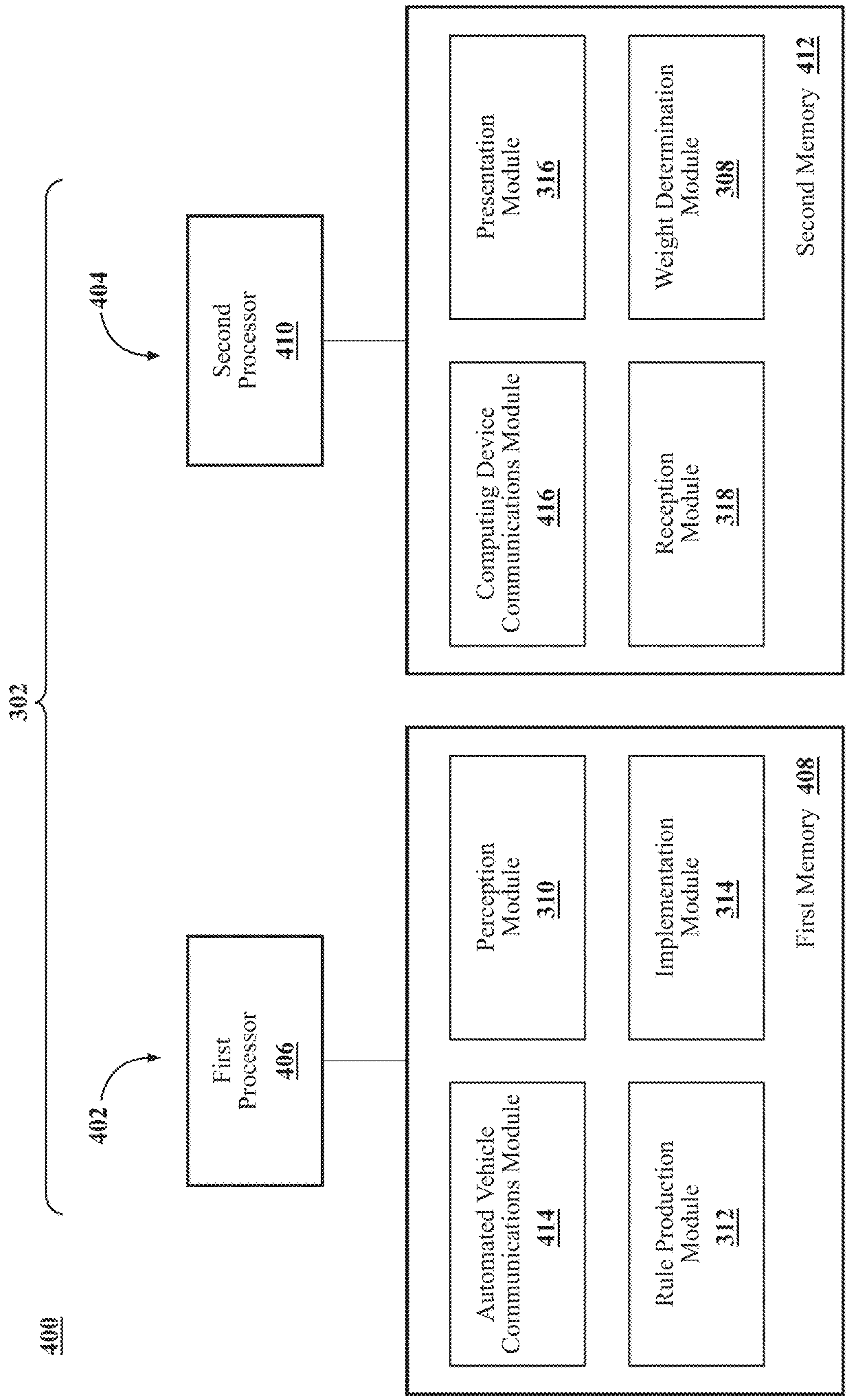
FIG. 4 includes a block diagram that illustrates a second example of the system for determining the weight for the rule that governs the manner of the performance of the change of the movement of the automated vehicle, according to the disclosed technologies.

FIG. 4 includes a block diagram that illustrates a second example 400 of the system 302 for determining the weight for the rule that governs the manner of the performance of the change of the movement of the automated vehicle, according to the disclosed technologies. The second example 400 of the system 302 can include, for example, an automated vehicle 402 and a computing device 404. For example, the computing device 404 can be separate from the automated vehicle 402. For example, the automated vehicle 402 can be the automated vehicle 202 illustrated in FIG. 2. For example, the computing device 404 can be the computing device 130 illustrated in FIG. 1. The second example 400 of the system 302 can include a first processor 406, a first memory 408, a second processor 410, and a second memory 412. The first memory 408 can be communicably coupled to the first processor 406. The second memory 412 can be communicably coupled to the second processor 410. For example, the first processor 406 and the first memory 408 can be disposed on the automated vehicle 402. For example, the second processor 410 and the second memory 412 can be disposed on the computing device 404.

For example, the first memory 408 can store a first portion of the system 302. In the second example 400 of the system 302, the first portion of the system 302 can be the portion 276 of the system 278 illustrated in FIG. 2. For example, the first memory 408 can store the perception module 310, the rule production module 312, the implementation module 314, and an automated vehicle communications module 414.

For example, the instructions to determine the existence of the reason to cause the change of the movement of the automated vehicle can include instructions to cause the first processor 406 to determine the existence of the reason to cause the change of the movement of the automated vehicle. For example, the instructions to produce the rule, with the weight applied, that governs the manner of the performance of the change of the movement of the automated vehicle can include instructions to cause the first processor 406 to produce the rule, with the weight applied that governs the manner of the performance of the change of the movement of the automated vehicle. For example, the instructions to cause the change of the movement of the automated vehicle can include instructions to cause the first processor 406 to cause the change of the movement of the automated vehicle. For example, the automated vehicle communications module 414 can include instructions that function to control the first processor 406 to receive the weight for the rule. With reference to FIG. 2, for example, the weight for the rule can be received by the communications device 274 included in the automated vehicle 202.

For example, the second memory 412 can store a second portion of the system 302. For example, the second memory 412 can store the weight determination module 308, the presentation module 316, the reception module 318, and a computing device communications module 416. For example, the instructions to cause the questions to be presented to the human subject can include instructions to cause the second processor 410 to cause the questions to be presented to the human subject. For example, the instructions to receive the responses can include instructions to cause the second processor 410 to receive the responses. For example, the instructions to determine the weight for the rule can include instructions to cause the second processor 410 to determine the weight for the rule. For example, the computing device communications module 416 can include instructions that function to control the second processor 410 to cause the weight for the rule to be transmitted to the automated vehicle 402. With reference to FIG. 1, for example, the weight for the rule can be transmitted by the communications device 132 included in the computing device 130.

For example, of the questions, a question can include a pairwise comparison question. For example, the pairwise comparison question can include a pair of options. For example, the pair of options can include a first option and a second option. For example, the first option can be about a first manner of the performance of the change of the movement of the automated vehicle. For example, the second option can be about a second manner of the performance of the change of the movement of the automated vehicle. For example, of the responses, a response to the pair of options can include one of the first option and the second option.

For example, the instructions to cause the pairwise comparison question to be presented to the human subject can include instructions to cause occurrences of: (1) a simulation of the first manner of the performance of the change of the movement of the automated vehicle and (2) a simulation of the second manner of the performance of the change of the movement of the automated vehicle. For example, in the second example 400 of the system 302, the computing device 404 can be a driving simulator.

In another implementation, for example, the weight can be a weight valuation from a weight valuations set. For example, a posterior distribution of the weight valuations set can have an initial value that is a quotient of one divided by a count of weight valuations in the weight valuations set. For example, the greedy technique can include performing, in an iterative manner until one or more of: (1) a count of the questions in the question set is zero, (2) a count of iterations is greater than a predefined limit of a number of the questions to be presented to the human subject, or (3) the posterior distribution of the weight valuations set is greater than a threshold: (1) determining, from the questions in the question set and based on members of a set of question-answer tuples associated with the question set, a specific question that has a maximum expected information gain over the weight valuations, (2) removing, from the question set, the specific question, (3) receiving a specific response to the specific question, (4) producing an adjustment of the set of question-answer tuples to reflect a selection of a question-answer tuple that includes the specific question and the specific response, (5) producing an update of the posterior distribution of the weight valuations set to reflect the adjustment of the set of question-answer tuples, and (6) determining, based on the update of the posterior distribution of the weight valuations set and for this iteration, a most-likely valuation of the weight from the weight valuations set. For example, the weight valuation can be determined from an intersection of a unit norm ball and a positive quadrant. For example, the maximum expected information gain over the weight valuations can be a function of an entropy of a random variable that represents a weight valuation of the human subject. For example, the maximum expected information gain over the weight valuations can be a function of the predefined limit of the number of the questions to be presented to the human subject. For example, the producing the update of the posterior distribution of the weight valuations set can include producing, using Bayes' Rule, the update of the posterior distribution of the weight valuations set.

In yet another implementation, for example, the instructions to cause the change of the movement of the automated vehicle can include instructions to cause a first signal to be transmitted to a control stage of an autonomous motion technology system of the automated vehicle. For example, the automated vehicle can be the automated vehicle 202 illustrated in FIG. 2. For example, the system 302 can be the at least the portion 276 of the system 278 illustrated in FIG. 2. For example, the control stage can be the control stage 220 illustrated in FIG. 2. For example, the autonomous motion technology system can be the autonomous motion technology system 214 illustrated in FIG. 2. For example, the first signal can include information about the rule. For example, the control stage can be configured to: (1) transmit a second signal to an actuator configured to cause the movement of the automated vehicle and (2) receive a third signal from a sensor configured to determine a measurement of a variable associated with the movement of the automated vehicle so that the movement of the automated vehicle occurs in accordance with the rule. For example, the variable can include one or more of a speed of the automated vehicle, an acceleration of the automated vehicle, a jerk of the automated vehicle, a distance between the automated vehicle and an object, a longitudinal distance between a longitudinal axis of the automated vehicle and the object, a lateral distance between the longitudinal axis of the automated vehicle and the object, or the like. For example, in accordance with the rule, the measurement of the variable can be a function of a measurement of another variable.

Returning to FIG. 1, for example, the diagram 100 can include a representation of a path 136 between the third vehicle 124 and the pedestrian 134. A first example of an employment of the disclosed technologies can be a determination of a weight, indicative of a preference of a human subject (i.e., a human driver) of the third vehicle 124, to be applied to a rule that governs a manner of a performance of a reduction of a speed of the third vehicle 124 along the path 136.

Figure 5:
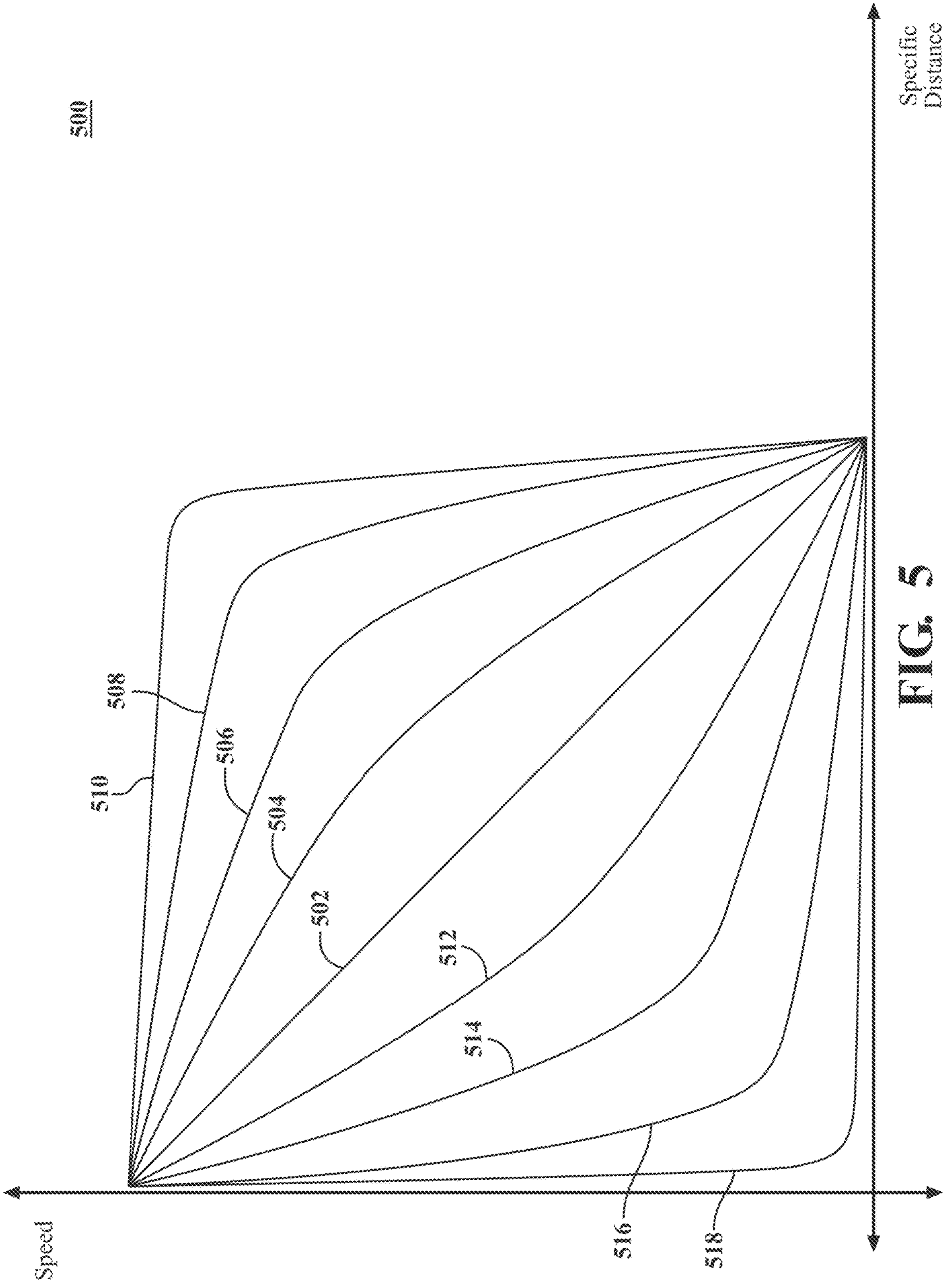
FIG. 5 includes graphs that illustrate examples of speed as a function of a specific distance to a point at which an automated vehicle is to stop that can be used for a first example of an employment of the disclosed technologies.

FIG. 5 includes graphs 500 that illustrate examples of speed as a function of a specific distance to a point at which an automated vehicle is to stop that can be used for the first example of the employment of the disclosed technologies. For example, the graphs 500 can include a first function 502, a second function 504, a third function 506, a fourth function 508, a fifth function 510, a sixth function 512, a seventh function 514, an eighth function 516, and a ninth function 518. For example, the first function 502 can represent a path in which a rate of the reduction of the speed is constant. For example, the second function 504 can represent a path in which a rate of the reduction of the speed is initially small, but becomes large. For example, the third function 506 can represent a path in which a rate of the reduction of the speed is initially smaller than the path represented by the second function 504, but becomes larger than the path represented by the second function 504. For example, the fourth function 508 can represent a path in which a rate of the reduction of the speed is initially smaller than the path represented by the third function 506, but becomes larger than the path represented by the third function 506. For example, the fifth function 510 can represent a path in which a rate of the reduction of the speed is initially smaller than the path represented by the fourth function 508, but becomes larger than the path represented by the fourth function 508. For example, the sixth function 512 can represent a path in which a rate of the reduction of the speed is initially large, but becomes small. For example, the seventh function 514 can represent a path in which a rate of the reduction of the speed is initially larger than the path represented by the sixth function 512, but becomes smaller than the path represented by the sixth function 512. For example, the eighth function 516 can represent a path in which a rate of the reduction of the speed is initially larger than the path represented by the seventh function 514, but becomes smaller than the path represented by the seventh function 514. For example, the ninth function 518 can represent a path in which a rate of the reduction of the speed is initially larger than the path represented by the eighth function 516, but becomes smaller than the path represented by the eighth function 516.

With reference to FIGS. 1-5, for example, of the questions, a question can include a pairwise comparison question. For example, the pairwise comparison question can include a pair of options. For example, the pair of options can include a first option and a second option. For example, the first option can be about a first manner of the performance of the reduction of the speed of the third vehicle 124 along the path 136. For example, the second option can be about a second manner of the performance of the reduction of the speed of the third vehicle 124 along the path 136. For example, the presentation module 316 can cause the pairwise comparison question to be presented to the human subject by causing occurrences of: (1) a simulation of the first manner of the performance of the reduction of the speed of the third vehicle 124 along the path 136 and (2) a simulation of the second manner of the performance of the reduction of the speed of the third vehicle 124 along the path 136.

For example, in a first iteration, the greedy algorithm can determine that a first pairwise comparison question that includes: (1) as the first option, the performance of the reduction of the speed of the third vehicle 124 along the path 136 represented by the third function 506 and (2) as the second option, the performance of the reduction of the speed of the third vehicle 124 along the path 136 represented by the seventh function 514 has the maximum expected information gain over the weight valuations. For example, in the first iteration, the presentation module 316 can cause: (1) as the first option, a simulation of the performance of the reduction of the speed of the third vehicle 124 along the path 136 represented by the third function 506 and (2) as the second option, a simulation of the performance of the reduction of the speed of the third vehicle 124 along the path 136 represented by the seventh function 514. For example, in the first iteration, the reception module 318 can receive, as the response to the first pairwise comparison question, an indication that the human subject prefers the simulation of the performance of the reduction of the speed of the third vehicle 124 along the path 136 represented by the third function 506. For example, in the first iteration, the greedy algorithm can: (1) produce the adjustment of the set of question-answer tuples to reflect a selection of a question-answer tuple that includes the first pairwise comparison question and the response to the first pairwise comparison question, (2) produce the update of the posterior distribution of the weight valuations set to reflect the adjustment of the set of question-answer tuples, and (3) determine, based on the update of the posterior distribution of the weight valuations set and for the first iteration, the most-likely valuation of the weight from the weight valuations set.

For example, in a second iteration, the greedy algorithm can determine that a second pairwise comparison question that includes: (1) as the first option, the performance of the reduction of the speed of the third vehicle 124 along the path 136 represented by the second function 504 and (2) as the second option, the performance of the reduction of the speed of the third vehicle 124 along the path 136 represented by the fourth function 508 has the maximum expected information gain over the weight valuations. For example, in the second iteration, the presentation module 316 can cause: (1) as the first option, a simulation of the performance of the reduction of the speed of the third vehicle 124 along the path 136 represented by the second function 504 and (2) as the second option, a simulation of the performance of the reduction of the speed of the third vehicle 124 along the path 136 represented by the fourth function 508. For example, in the second iteration, the reception module 318 can receive, as the response to the second pairwise comparison question, an indication that the human subject prefers the simulation of the performance of the reduction of the speed of the third vehicle 124 along the path 136 represented by the fourth function 508. For example, in the second iteration, the greedy algorithm can: (1) produce the adjustment of the set of question-answer tuples to reflect a selection of a question-answer tuple that includes the second pairwise comparison question and the response to the second pairwise comparison question, (2) produce the update of the posterior distribution of the weight valuations set to reflect the adjustment of the set of question-answer tuples, and (3) determine, based on the update of the posterior distribution of the weight valuations set and for the second iteration, the most-likely valuation of the weight from the weight valuations set.

For example, the weight determination module 308 can determine from responses, from the human subject, that the weight to be applied to the rule that governs the manner of the performance of the reduction of the speed of the third vehicle 124 along the path 136 can be associated with the fourth function 508.

For example, the perception module 310 of the third vehicle 124 can determine that a presence of one or more of the stop sign 116 or the pedestrian 134 is an existence of a reason to cause the reduction of the speed of the third vehicle 124 along the path 136.

For example, the rule production module 312 of the third vehicle 124 can produce the rule, with the weight applied, that governs the manner of the performance of the reduction of the speed of the third vehicle 124 along the path 136.

For example, the implementation module 314 of the third vehicle 124 can cause a first signal to be transmitted to the control stage 220 of the autonomous motion technology system 214 of the automated vehicle 202 (i.e., the third vehicle 124). For example, the control stage 220 can be configured to: (1) transmit a second signal to the one or more actuators 224 configured to control the one or more brakes 208 and (2) receive a third signal from the speedometer 244 so that the movement of the automated vehicle 202 (i.e., the third vehicle 124) occurs in accordance with the rule.

Returning to FIG. 1, for example, the diagram 100 can include a representation of a path 138 between the first vehicle 120 in the eastbound lane 110 and a position in the westbound lane 108 abreast of the second vehicle 122. A second example of an employment of the disclosed technologies can be a determination of a weight, indicative of a preference of a human subject (i.e., a human driver) of the first vehicle 120, to be applied to a rule that governs a manner of a performance of a change of a path of the movement of the first vehicle 120 from the eastbound lane 110 to the westbound lane 108 in order to overtake the second vehicle 122.

Figure 6:
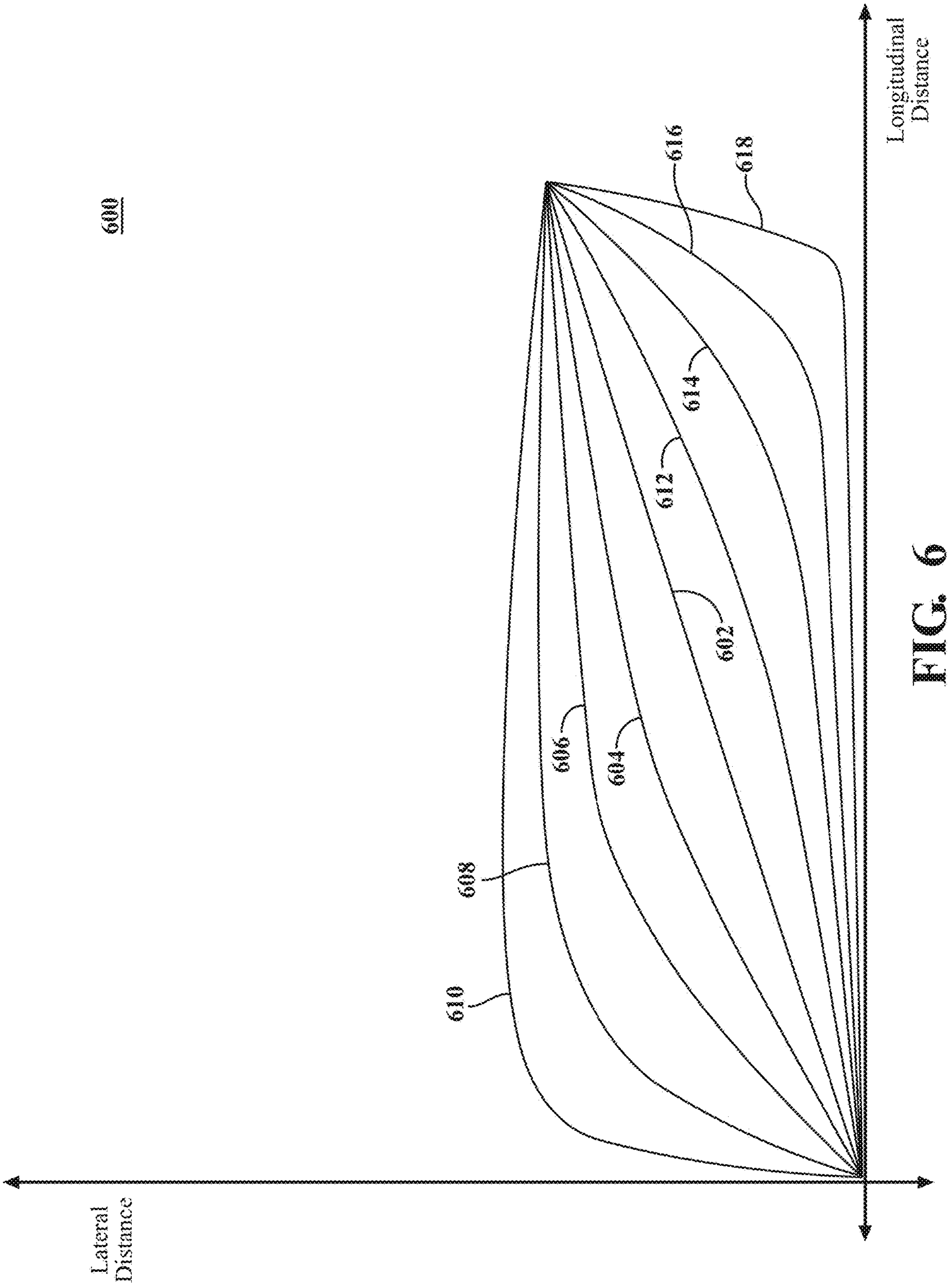
FIG. 6 includes graphs that illustrate examples of lateral distance as a function of longitudinal distance that can be used for a second example of an employment of the disclosed technologies.

FIG. 6 includes graphs 600 that illustrate examples of lateral distance as a function of longitudinal distance that can be used for the second example of the employment of the disclosed technologies. For example, the graphs 600 can include a first function 602, a second function 604, a third function 606, a fourth function 608, a fifth function 610, a sixth function 612, a seventh function 614, an eighth function 616, and a ninth function 618. For example, the first function 602 can represent a path in which a change in a lateral direction with respect to a longitudinal direction is constant (i.e., the path 138). For example, the second function 604 can represent a path in which a change in the lateral direction with respect to the longitudinal direction is initially large, but becomes small. For example, the third function 606 can represent a path in which a change in the lateral direction with respect to the longitudinal direction is initially larger than the path represented by the second function 604, but becomes smaller than the path represented by the second function 604. For example, the fourth function 608 can represent a path in which a change in the lateral direction with respect to the longitudinal direction is initially larger than the path represented by the third function 606, but becomes smaller than the path represented by the third function 606. For example, the fifth function 610 can represent a path in which a change in the lateral direction with respect to the longitudinal direction is initially larger than the path represented by the fourth function 608, but becomes smaller than the path represented by the fourth function 608. For example, the sixth function 612 can represent a path in which a change in the lateral direction with respect to the longitudinal direction is initially small, but becomes large. For example, the seventh function 614 can represent a path in which a change in the lateral direction with respect to the longitudinal direction is initially smaller than the path represented by the sixth function 612, but becomes larger than the path represented by the sixth function 612. For example, the eighth function 616 can represent a path in which a change in the lateral direction with respect to the longitudinal direction is initially smaller than the path represented by the seventh function 614, but becomes larger than the path represented by the seventh function 614. For example, the ninth function 618 can represent a path in which a change in the lateral direction with respect to the longitudinal direction is initially smaller than the path represented by the eighth function 616, but becomes larger than the path represented by the eighth function 616.

With reference to FIGS. 1-4 and 6, for example, of the questions, a question can include a pairwise comparison question. For example, the pairwise comparison question can include a pair of options. For example, the pair of options can include a first option and a second option. For example, the first option can be about a first manner of the performance of the change of the path of the movement of the first vehicle 120 from the eastbound lane 110 to the westbound lane 108 in order to overtake the second vehicle 122. For example, the second option can be about a second manner of the performance of the change of the path of the movement of the first vehicle 120 from the eastbound lane 110 to the westbound lane 108 in order to overtake the second vehicle 122. For example, the presentation module 316 can cause the pairwise comparison question to be presented to the human subject by causing occurrences of: (1) a simulation of the first manner of the performance of the change of the path of the movement of the first vehicle 120 from the eastbound lane 110 to the westbound lane 108 in order to overtake the second vehicle 122 and (2) a simulation of the second manner of the performance of the change of the path of the movement of the first vehicle 120 from the eastbound lane 110 to the westbound lane 108 in order to overtake the second vehicle 122.

For example, in a first iteration, the greedy algorithm can determine that a first pairwise comparison question that includes: (1) as the first option, the performance of the change of the path of the movement of the first vehicle 120 from the eastbound lane 110 to the westbound lane 108 in order to overtake the second vehicle 122 represented by the third function 606 and (2) as the second option, the performance of the change of the path of the movement of the first vehicle 120 from the eastbound lane 110 to the westbound lane 108 in order to overtake the second vehicle 122 represented by the seventh function 614 has the maximum expected information gain over the weight valuations. For example, in the first iteration, the presentation module 316 can cause: (1) as the first option, a simulation of the performance of the change of the path of the movement of the first vehicle 120 from the eastbound lane 110 to the westbound lane 108 in order to overtake the second vehicle 122 represented by the third function 606 and (2) as the second option, a simulation of the performance of the change of the path of the movement of the first vehicle 120 from the eastbound lane 110 to the westbound lane 108 in order to overtake the second vehicle 122 represented by the seventh function 614. For example, in the first iteration, the reception module 318 can receive, as the response to the first pairwise comparison question, an indication that the human subject prefers the simulation of the performance of the change of the path of the movement of the first vehicle 120 from the eastbound lane 110 to the westbound lane 108 in order to overtake the second vehicle 122 represented by the third function 606. For example, in the first iteration, the greedy algorithm can: (1) produce the adjustment of the set of question-answer tuples to reflect a selection of a question-answer tuple that includes the first pairwise comparison question and the response to the first pairwise comparison question, (2) produce the update of the posterior distribution of the weight valuations set to reflect the adjustment of the set of question-answer tuples, and (3) determine, based on the update of the posterior distribution of the weight valuations set and for the first iteration, the most-likely valuation of the weight from the weight valuations set.

For example, in a second iteration, the greedy algorithm can determine that a first pairwise comparison question that includes: (1) as the first option, the performance of the change of the path of the movement of the first vehicle 120 from the eastbound lane 110 to the westbound lane 108 in order to overtake the second vehicle 122 represented by the second function 604 and (2) as the second option, the performance of the change of the path of the movement of the first vehicle 120 from the eastbound lane 110 to the westbound lane 108 in order to overtake the second vehicle 122 represented by the fourth function 608 has the maximum expected information gain over the weight valuations. For example, in the second iteration, the presentation module 316 can cause: (1) as the first option, a simulation of the performance of the change of the path of the movement of the first vehicle 120 from the eastbound lane 110 to the westbound lane 108 in order to overtake the second vehicle 122 represented by the second function 604 and (2) as the second option, a simulation of the performance of the change of the path of the movement of the first vehicle 120 from the eastbound lane 110 to the westbound lane 108 in order to overtake the second vehicle 122 represented by the fourth function 608. For example, in the second iteration, the reception module 318 can receive, as the response to the second pairwise comparison question, an indication that the human subject prefers the simulation of the performance of the change of the path of the movement of the first vehicle 120 from the eastbound lane 110 to the westbound lane 108 in order to overtake the second vehicle 122 represented by the second function 604. For example, in the second iteration, the greedy algorithm can: (1) produce the adjustment of the set of question-answer tuples to reflect a selection of a question-answer tuple that includes the second pairwise comparison question and the response to the second pairwise comparison question, (2) produce the update of the posterior distribution of the weight valuations set to reflect the adjustment of the set of question-answer tuples, and (3) determine, based on the update of the posterior distribution of the weight valuations set and for the second iteration, the most-likely valuation of the weight from the weight valuations set.

For example, the weight determination module 308 can determine from responses, from the human subject, that the weight to be applied to the rule that governs the manner of the performance of the change of the path of the movement of the first vehicle 120 from the eastbound lane 110 to the westbound lane 108 in order to overtake the second vehicle 122 can be associated with the second function 604.

For example, the perception module 310 of the first vehicle 120 can determine that a presence of the second vehicle 122 is an existence of a reason to cause the change of the path of the movement of the first vehicle 120 from the eastbound lane 110 to the westbound lane 108 in order to overtake the second vehicle 122.

For example, the rule production module 312 of the first vehicle 120 can produce the rule, with the weight applied, that governs the manner of the performance of the change of the path of the movement of the first vehicle 120 from the eastbound lane 110 to the westbound lane 108 in order to overtake the second vehicle 122.

For example, the implementation module 314 of the first vehicle 120 can cause a first signal to be transmitted to the control stage 220 of the autonomous motion technology system 214 of the automated vehicle 202 (i.e., the first vehicle 120). For example, the control stage 220 can be configured to: (1) transmit a second signal to the actuator 222 configured to control the steering linkage 206 and (2) receive a third signal from one or more of the lidar device 264, the radar device 266, the ultrasonic device 268, the infrared device 270, the camera 272, or the like so that the movement of the automated vehicle 202 (i.e., the first vehicle 120) occurs in accordance with the rule.

Figure 7:
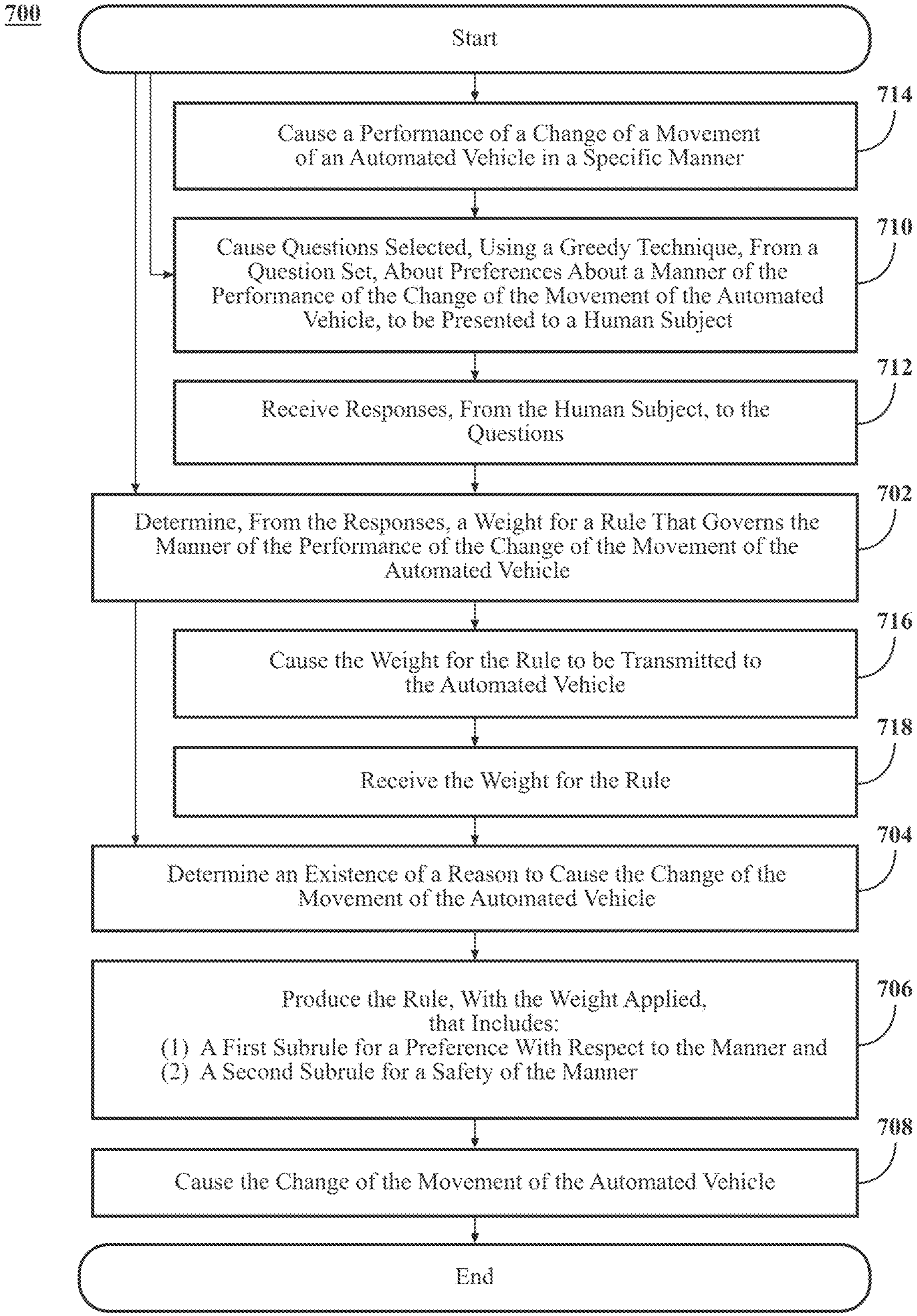
FIG. 7 includes a flow diagram that illustrates an example of a method that is associated with determining a weight for a rule that governs a manner of a performance of a change of a movement of an automated vehicle, according to the disclosed technologies.

FIG. 7 includes a flow diagram that illustrates an example of a method 700 that is associated with determining a weight to be applied to a rule that governs a change in a movement of an automated vehicle, according to the disclosed technologies. For example, the automated vehicle can be an autonomous vehicle. For example, the rule can be expressed using weighted signal temporal logic. Although the method 700 is described in combination with the system 302 illustrated in FIGS. 3 and 4, one of skill in the art understands, in light of the description herein, that the method 700 is not limited to being implemented by the system 302 illustrated in FIGS. 3 and 4. Rather, the system 302 illustrated in FIGS. 3 and 4 is an example of a system that may be used to implement the method 700. Additionally, although the method 700 is illustrated as a generally serial process, various aspects of the method 700 may be able to be executed in parallel.

In FIG. 7, in the method 700, at an operation 702, for example, the weight determination module 308 can determine from responses, from a human subject, to questions about preferences about the manner of the performance of the change of the movement of the automated vehicle, the weight for the rule. For example, the questions can be selected, using a greedy technique, from a question set.

At an operation 704, for example, the perception module 310 can determine an existence of a reason to cause the change of the movement of the automated vehicle.

At an operation 706, for example, the rule production module 312 can produce the rule, with the weight applied, that governs the manner of the performance of the change of the movement of the automated vehicle. For example, the rule can include: (1) a first subrule for a preference with respect to the manner of the performance of the change of the movement of the automated vehicle and (2) a second subrule for a safety of the manner of the performance of the change of the movement of the automated vehicle. For example, the preference can be with respect to one or more of: (1) a degree of comfort of the human subject during the performance of the change of the movement of the automated vehicle, (2) a degree of vehicle performance of the automated vehicle during the performance of the change of the movement of the automated vehicle, or (3) the like.

At an operation 708, for example, the implementation module 314 can cause the change of the movement of the automated vehicle.

In an implementation, additionally: (1) at an operation 710, for example, the presentation module 316 can cause the questions to be presented to the human subject and (2) at an operation 712, for example, the reception module 318 can receive the responses.

For example: (1) the operation 710, (2) the operation 712, and (3) the operation 702 can be performed before the human subject causes the automated vehicle to be operated on a public road.

Additionally or alternatively, for example, at an operation 714, the implementation module 314 can cause, before the operation 702, the performance of the change of the movement of the automated vehicle in a specific manner. For example: (1) the operation 710, (2) the operation 712, and (3) the operation 702 can be performed in response to the performance of the change of the movement of the automated vehicle in the specific manner.

For example, at the operation 710, the presentation module 316 can be disposed on a computing device 404. For example, the computing device 404 can be separate from the automated vehicle 402. For example, at the operation 712, the reception module 318 can be disposed on the computing device 404. For example, at the operation 702, the weight determination module 308 can be disposed on the computing device 404. Additionally: (1) at an operation 716, for example, the computing device communications module 416, disposed on the computing device 404, can cause the weight for the rule to be transmitted to the automated vehicle 402 and (2) at an operation 718, for example, the automated vehicle communications module 414, disposed on the automated vehicle 402, can receive the weight for the rule. For example, at the operation 704, the perception module 310 can be disposed on the automated vehicle 402. For example, at the operation 706, the rule production module 312 can be disposed on the automated vehicle 402. For example, at the operation 708, the implementation module 314 can be disposed on the automated vehicle 402.

For example, of the questions, a question can include a pairwise comparison question. For example, the pairwise comparison question can include a pair of options. For example, the pair of options can include a first option and a second option. For example, the first option can be about a first manner of the performance of the change of the movement of the automated vehicle. For example, the second option can be about a second manner of the performance of the change of the movement of the automated vehicle. For example, of the responses, a response to the pair of options can include one of the first option and the second option.

For example, at the operation 710, the presentation module 316 can cause occurrences of: (1) a simulation of the first manner of the performance of the change of the movement of the automated vehicle and (2) a simulation of the second manner of the performance of the change of the movement of the automated vehicle. For example, in the second example 400 of the system 302, the computing device 404 can be a driving simulator.

In another implementation, for example, the weight can be a weight valuation from a weight valuations set. For example, a posterior distribution of the weight valuations set can have an initial value that is a quotient of one divided by a count of weight valuations in the weight valuations set. For example, the greedy technique can include performing, in an iterative manner until one or more of: (1) a count of the questions in the question set is zero, (2) a count of iterations is greater than a predefined limit of a number of the questions to be presented to the human subject, or (3) the posterior distribution of the weight valuations set is greater than a threshold: (1) determining, from the questions in the question set and based on members of a set of question-answer tuples associated with the question set, a specific question that has a maximum expected information gain over the weight valuations, (2) removing, from the question set, the specific question, (3) receiving a specific response to the specific question, (4) producing an adjustment of the set of question-answer tuples to reflect a selection of a question-answer tuple that includes the specific question and the specific response, (5) producing an update of the posterior distribution of the weight valuations set to reflect the adjustment of the set of question-answer tuples, and (6) determining, based on the update of the posterior distribution of the weight valuations set and for this iteration, a most-likely valuation of the weight from the weight valuations set. For example, the weight valuation can be determined from an intersection of a unit norm ball and a positive quadrant. For example, the maximum expected information gain over the weight valuations can be a function of an entropy of a random variable that represents a weight valuation of the human subject. For example, the maximum expected information gain over the weight valuations can be a function of the predefined limit of the number of the questions to be presented to the human subject. For example, the producing the update of the posterior distribution of the weight valuations set can include producing, using Bayes' Rule, the update of the posterior distribution of the weight valuations set.

In yet another implementation, for example, at the operation 708, the implementation module 314 can cause a first signal to be transmitted to a control stage of an autonomous motion technology system of the automated vehicle. For example, the first signal can include information about the rule. For example, the control stage can be configured to: (1) transmit a second signal to an actuator configured to cause the movement of the automated vehicle and (2) receive a third signal from a sensor configured to determine a measurement of a variable associated with the movement of the automated vehicle so that the movement of the automated vehicle occurs in accordance with the rule. For example, the variable can include one or more of a speed of the automated vehicle, an acceleration of the automated vehicle, a jerk of the automated vehicle, a distance between the automated vehicle and an object, a longitudinal distance between a longitudinal axis of the automated vehicle and the object, a lateral distance between the longitudinal axis of the automated vehicle and the object, or the like. For example, in accordance with the rule, the measurement of the variable can be a function of a measurement of another variable.

Figure 8:
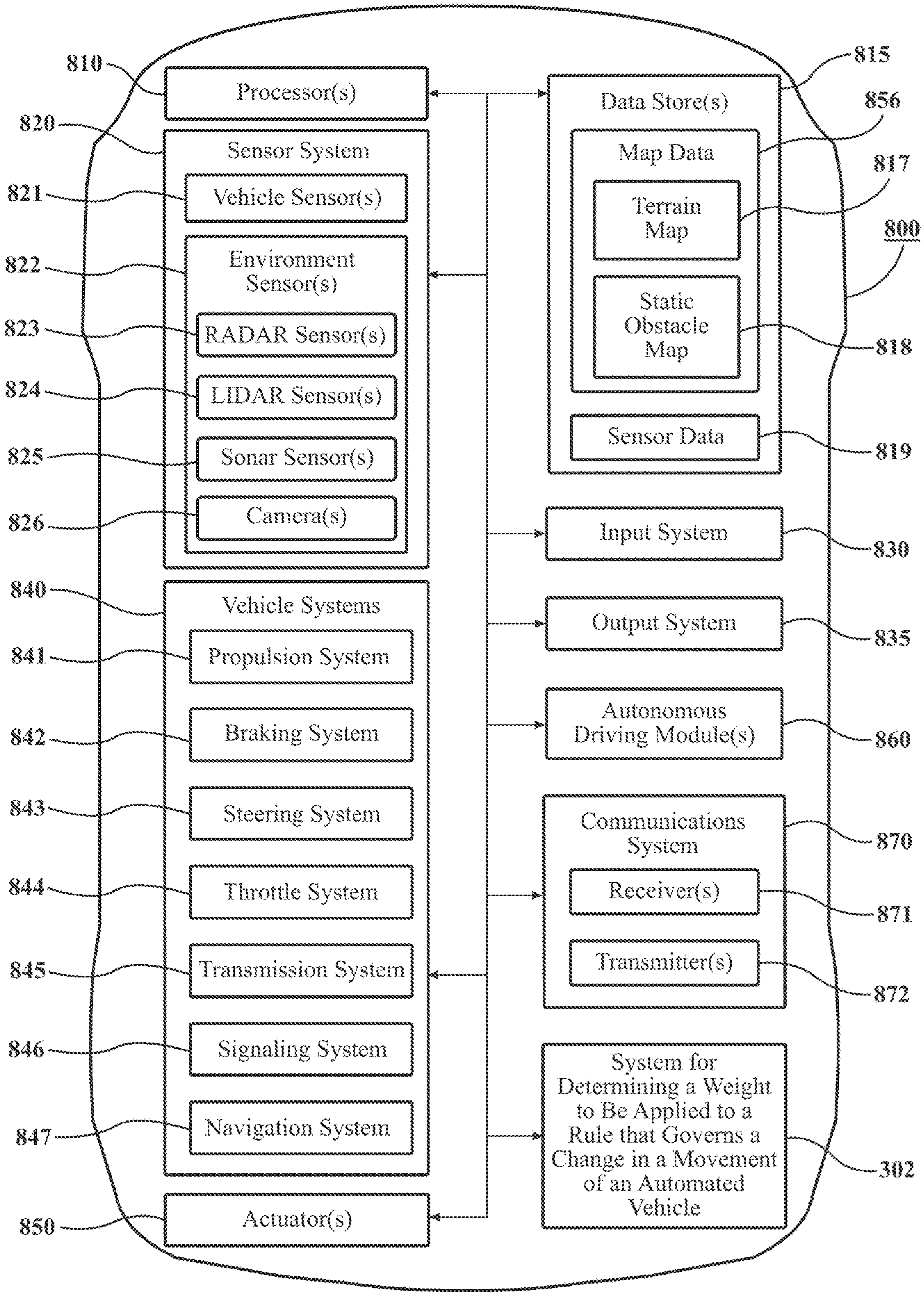
FIG. 8 includes a block diagram that illustrates an example of elements disposed on a vehicle, according to the disclosed technologies.

FIG. 8 includes a block diagram that illustrates an example of elements disposed on a vehicle 800, according to the disclosed technologies. As used herein, a "vehicle" can be any form of powered transport. In one or more implementations, the vehicle 800 can be an automobile. While arrangements described herein are with respect to automobiles, one of skill in the art understands, in light of the description herein, that embodiments are not limited to automobiles. For example, functions and/or operations of one or more of the first vehicle 120 (illustrated in FIG. 1), the third vehicle 124 (illustrated in FIG. 1), the automated vehicle 200 (illustrated in FIG. 2), or the automated vehicle 402 (illustrated in FIG. 4) can be realized by the vehicle 800.

In some embodiments, the vehicle 800 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 800 is performed according to inputs received from a user (e.g., human driver). In one or more arrangements, the vehicle 800 can be a conventional vehicle that is configured to operate in only a manual mode.

In one or more embodiments, the vehicle 800 can be an automated vehicle. As used herein, "automated vehicle" can refer to a vehicle that operates in an automated mode. As used herein, "automated mode" can refer to navigating and/or maneuvering the vehicle 800 along a travel route using one or more computing systems to control the vehicle 800 with minimal or no input from a human driver. In one or more embodiments, the vehicle 800 can be highly automated or completely automated. In one embodiment, the vehicle 800 can be configured with one or more semi-automated operational modes in which one or more computing systems perform a portion of the navigation and/or maneuvering of the vehicle along a travel route, and a vehicle operator (i.e., driver) provides inputs to the vehicle 800 to perform a portion of the navigation and/or maneuvering of the vehicle 800 along a travel route.

For example, Standard J3016 202104, Taxonomy and Definitions for Terms Related to Driving Automation Systems for On-Road Motor Vehicles, issued by the Society of Automotive Engineers (SAE) International on Jan. 16, 2014, and most recently revised on Apr. 30, 2021, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 800 can include various elements. The vehicle 800 can have any combination of the various elements illustrated in FIG. 8. In various embodiments, it may not be necessary for the vehicle 800 to include all of the elements illustrated in FIG. 8. Furthermore, the vehicle 800 can have elements in addition to those illustrated in FIG. 8. While the various elements are illustrated in FIG. 8 as being located within the vehicle 800, one or more of these elements can be located external to the vehicle 800. Furthermore, the elements illustrated may be physically separated by large distances. For example, as described, one or more components of the disclosed system can be implemented within the vehicle 800 while other components of the system can be implemented within a cloud-computing environment, as described below. For example, the elements can include one or more processors 810, one or more data stores 815, a sensor system 820, an input system 830, an output system 835, vehicle systems 840, one or more actuators 850, one or more automated driving modules 860, a communications system 870, and the system 302 for determining a weight to be applied to a rule that governs a change in a movement of an automated vehicle.

In one or more arrangements, the one or more processors 810 can be a main processor of the vehicle 800. For example, the one or more processors 810 can be an electronic control unit (ECU). For example, functions and/or operations of the processor 304 (illustrated in FIG. 3) or the first processor 406 (illustrated in FIG. 4) can be realized by the one or more processors 810.

The one or more data stores 815 can store, for example, one or more types of data. The one or more data stores 815 can include volatile memory and/or non-volatile memory. Examples of suitable memory for the one or more data stores 815 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 815 can be a component of the one or more processors 810. Additionally or alternatively, the one or more data stores 815 can be operatively connected to the one or more processors 810 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation. For example, functions and/or operations of the memory 306 (illustrated in FIG. 3) or the first memory 408 (illustrated in FIG. 4) can be realized by the one or more data stores 815.

In one or more arrangements, the one or more data stores 815 can store map data 816. The map data 816 can include maps of one or more geographic areas. In some instances, the map data 816 can include information or data on roads, traffic control devices, road markings, structures, features, and/or landmarks in the one or more geographic areas. The map data 816 can be in any suitable form. In some instances, the map data 816 can include aerial views of an area. In some instances, the map data 816 can include ground views of an area, including 360-degree ground views. The map data 816 can include measurements, dimensions, distances, and/or information for one or more items included in the map data 816 and/or relative to other items included in the map data 816. The map data 816 can include a digital map with information about road geometry. The map data 816 can be high quality and/or highly detailed.

In one or more arrangements, the map data 816 can include one or more terrain maps 817. The one or more terrain maps 817 can include information about the ground, terrain, roads, surfaces, and/or other features of one or more geographic areas. The one or more terrain maps 817 can include elevation data of the one or more geographic areas. The map data 816 can be high quality and/or highly detailed. The one or more terrain maps 817 can define one or more ground surfaces, which can include paved roads, unpaved roads, land, and other things that define a ground surface.

In one or more arrangements, the map data 816 can include one or more static obstacle maps 818. The one or more static obstacle maps 818 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 818 can have location data, size data, dimension data, material data, and/or other data associated with them. The one or more static obstacle maps 818 can include measurements, dimensions, distances, and/or information for one or more static obstacles. The one or more static obstacle maps 818 can be high quality and/or highly detailed. The one or more static obstacle maps 818 can be updated to reflect changes within a mapped area.

In one or more arrangements, the one or more data stores 815 can store sensor data 819. As used herein, "sensor data" can refer to any information about the sensors with which the vehicle 800 can be equipped including the capabilities of and other information about such sensors. The sensor data 819 can relate to one or more sensors of the sensor system 820. For example, in one or more arrangements, the sensor data 819 can include information about one or more lidar sensors 824 of the sensor system 820.

In some arrangements, at least a portion of the map data 816 and/or the sensor data 819 can be located in one or more data stores 815 that are located onboard the vehicle 800. Additionally or alternatively, at least a portion of the map data 816 and/or the sensor data 819 can be located in one or more data stores 815 that are located remotely from the vehicle 800.

The sensor system 820 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 820 includes a plurality of sensors, the sensors can work independently from each other. Alternatively, two or more of the sensors can work in combination with each other. In such a case, the two or more sensors can form a sensor network. The sensor system 820 and/or the one or more sensors can be operatively connected to the one or more processors 810, the one or more data stores 815, and/or another element of the vehicle 800 (including any of the elements illustrated in FIG. 8). The sensor system 820 can acquire data of at least a portion of the external environment of the vehicle 800 (e.g., nearby vehicles). The sensor system 820 can include any suitable type of sensor. Various examples of different types of sensors are described herein. However, one of skill in the art understands that the embodiments are not limited to the particular sensors described herein.

The sensor system 820 can include one or more vehicle sensors 821. The one or more vehicle sensors 821 can detect, determine, and/or sense information about the vehicle 800 itself. In one or more arrangements, the one or more vehicle sensors 821 can be configured to detect and/or sense position and orientation changes of the vehicle 800 such as, for example, based on inertial acceleration. In one or more arrangements, the one or more vehicle sensors 821 can include one or more accelerometers, one or more gyroscopes, an inertial measurement unit (IMU), a dead-reckoning system, a global navigation satellite system (GNSS), a global positioning system (GPS), a navigation system 847, and/or other suitable sensors. The one or more vehicle sensors 821 can be configured to detect and/or sense one or more characteristics of the vehicle 800. In one or more arrangements, the one or more vehicle sensors 821 can include a speedometer to determine a current speed of the vehicle 800. For example, functions and/or operations of the speedometer 244 (illustrated in FIG. 2), the accelerometer 246 (illustrated in FIG. 2), the gyroscope 248 (illustrated in FIG. 2), the global navigation satellite system (GNSS) 250 (illustrated in FIG. 2), the brake pressure sensor 252 (illustrated in FIG. 2), the wheel speed sensor 254 (illustrated in FIG. 2), the throttle position sensor 256 (illustrated in FIG. 2), the electric drive motor ammeter 258 (illustrated in FIG. 2), the steering operator interface position sensor 260 (illustrated in FIG. 2), or the steering operator interface applied force sensor 262 (illustrated in FIG. 2) can be realized by the one or more vehicle sensors 821.

Additionally or alternatively, the sensor system 820 can include one or more environment sensors 822 configured to acquire and/or sense driving environment data. As used herein, "driving environment data" can include data or information about the external environment in which a vehicle is located or one or more portions thereof. For example, the one or more environment sensors 822 can be configured to detect, quantify, and/or sense obstacles in at least a portion of the external environment of the vehicle 800 and/or information/data about such obstacles. Such obstacles may be stationary objects and/or dynamic objects. The one or more environment sensors 822 can be configured to detect, measure, quantify, and/or sense other things in the external environment of the vehicle 800 such as, for example, lane markers, signs, traffic lights, traffic signs, lane lines, crosswalks, curbs proximate the vehicle 800, off-road objects, etc.

Various examples of sensors of the sensor system 820 are described herein. The example sensors may be part of the one or more vehicle sensors 821 and/or the one or more environment sensors 822. However, one of skill in the art understands that the embodiments are not limited to the particular sensors described.

In one or more arrangements, the one or more environment sensors 822 can include one or more radar sensors 823, one or more lidar sensors 824, one or more sonar sensors 825, and/or one more cameras 826. In one or more arrangements, the one or more cameras 826 can be one or more high dynamic range (HDR) cameras or one or more infrared (IR) cameras. For example, the one or more cameras 826 can be used to record a reality of a state of an item of information that can appear in the digital map. For example, functions and/or operations of the radar device 266 (illustrated in FIG. 2) can be realized by the one or more radar sensors 823. For example, functions and/or operations of the lidar device 264 (illustrated in FIG. 2) can be realized by the one or more lidar sensors 824. For example, functions and/or operations of the ultrasonic device 268 (illustrated in FIG. 2) can be realized by the one or more sonar sensors 825. For example, functions and/or operations of one or more of the infrared device 270 (illustrated in FIG. 2) or the camera 272 (illustrated in FIG. 2) can be realized by the one or more cameras 826.

The input system 830 can include any device, component, system, element, arrangement, or groups thereof that enable information/data to be entered into a machine. The input system 830 can receive an input from a vehicle passenger (e.g., a driver or a passenger). The output system 835 can include any device, component, system, element, arrangement, or groups thereof that enable information/data to be presented to a vehicle passenger (e.g., a driver or a passenger).

Various examples of the one or more vehicle systems 840 are illustrated in FIG. 8. However, one of skill in the art understands that the vehicle 800 can include more, fewer, or different vehicle systems. Although particular vehicle systems can be separately defined, each or any of the systems or portions thereof may be otherwise combined or segregated via hardware and/or software within the vehicle 800. For example, the one or more vehicle systems 840 can include a propulsion system 841, a braking system 842, a steering system 843, a throttle system 844, a transmission system 845, a signaling system 846, and/or the navigation system 847. Each of these systems can include one or more devices, components, and/or a combination thereof, now known or later developed. For example, functions and/or operations of the internal combustion engine 210 (illustrated in FIG. 2) or the electric drive motor 212 (illustrated in FIG. 2) can be realized by the propulsion system 841. For example, functions and/or operations of the brakes 208 (illustrated in FIG. 2) can be realized by the braking system 842. For example, functions and/or operations of the steering linkage 206 (illustrated in FIG. 2) can be realized by the steering system 843.

The navigation system 847 can include one or more devices, applications, and/or combinations thereof, now known or later developed, configured to determine the geographic location of the vehicle 800 and/or to determine a travel route for the vehicle 800. The navigation system 847 can include one or more mapping applications to determine a travel route for the vehicle 800. The navigation system 847 can include a global positioning system, a local positioning system, a geolocation system, and/or a combination thereof.

The one or more actuators 850 can be any element or combination of elements operable to modify, adjust, and/or alter one or more of the vehicle systems 840 or components thereof responsive to receiving signals or other inputs from the one or more processors 810 and/or the one or more automated driving modules 860. Any suitable actuator can be used. For example, the one or more actuators 850 can include motors, pneumatic actuators, hydraulic pistons, relays, solenoids, and/or piezoelectric actuators. For example, functions and/or operations of the actuator 222 (illustrated in FIG. 2), the actuator 224 (illustrated in FIG. 2), the actuator 226 (illustrated in FIG. 2), or the actuator 228 (illustrated in FIG. 2) can be realized by the one or more actuators 850.

The one or more processors 810 and/or the one or more automated driving modules 860 can be operatively connected to communicate with the various vehicle systems 840 and/or individual components thereof. For example, the one or more processors 810 and/or the one or more automated driving modules 860 can be in communication to send and/or receive information from the various vehicle systems 840 to control the movement, speed, maneuvering, heading, direction, etc. of the vehicle 800. The one or more processors 810 and/or the one or more automated driving modules 860 may control some or all of these vehicle systems 840 and, thus, may be partially or fully automated.

The one or more processors 810 and/or the one or more automated driving modules 860 may be operable to control the navigation and/or maneuvering of the vehicle 800 by controlling one or more of the vehicle systems 840 and/or components thereof. For example, when operating in an automated mode, the one or more processors 810 and/or the one or more automated driving modules 860 can control the direction and/or speed of the vehicle 800. The one or more processors 810 and/or the one or more automated driving modules 860 can cause the vehicle 800 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The communications system 870 can include one or more receivers 871 and/or one or more transmitters 872. The communications system 870 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 870 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies. For example, functions and/or operations of the communications device 126 (illustrated in FIG. 1), the communications device 128 (illustrated in FIG. 1), or the communications device 274 (illustrated in FIG. 2) can be realized by the communications system 870.

Moreover, the one or more processors 810, the one or more data stores 815, and the communications system 870 can be configured to one or more of form a micro cloud, participate as a member of a micro cloud, or perform a function of a leader of a micro cloud. A micro cloud can be characterized by a distribution, among members of the micro cloud, of one or more of one or more computing resources or one or more data storage resources in order to collaborate on executing operations. The members can include at least connected vehicles.

The vehicle 800 can include one or more modules, at least some of which are described herein. The modules can be implemented as computer-readable program code that, when executed by the one or more processors 810, implement one or more of the various processes described herein. One or more of the modules can be a component of the one or more processors 810. Additionally or alternatively, one or more of the modules can be executed on and/or distributed among other processing systems to which the one or more processors 810 can be operatively connected. The modules can include instructions (e.g., program logic) executable by the one or more processors 810. Additionally or alternatively, the one or more data store 815 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 800 can include one or more automated driving modules 860. The one or more automated driving modules 860 can be configured to receive data from the sensor system 820 and/or any other type of system capable of capturing information relating to the vehicle 800 and/or the external environment of the vehicle 800. In one or more arrangements, the one or more automated driving modules 860 can use such data to generate one or more driving scene models. The one or more automated driving modules 860 can determine position and velocity of the vehicle 800. The one or more automated driving modules 860 can determine the location of obstacles, obstacles, or other environmental features including traffic signs, trees, shrubs, neighboring vehicles, pedestrians, etc.

The one or more automated driving modules 860 can be configured to receive and/or determine location information for obstacles within the external environment of the vehicle 800 for use by the one or more processors 810 and/or one or more of the modules described herein to estimate position and orientation of the vehicle 800, vehicle position in global coordinates based on signals from a plurality of satellites, or any other data and/or signals that could be used to determine the current state of the vehicle 800 or determine the position of the vehicle 800 with respect to its environment for use in either creating a map or determining the position of the vehicle 800 in respect to map data.

The one or more automated driving modules 860 can be configured to determine one or more travel paths, current automated driving maneuvers for the vehicle 800, future automated driving maneuvers and/or modifications to current automated driving maneuvers based on data acquired by the sensor system 820, driving scene models, and/or data from any other suitable source such as determinations from the sensor data 819. As used herein, "driving maneuver" can refer to one or more actions that affect the movement of a vehicle. Examples of driving maneuvers include: accelerating, decelerating, braking, turning, moving in a lateral direction of the vehicle 800, changing travel lanes, merging into a travel lane, and/or reversing, just to name a few possibilities. The one or more automated driving modules 860 can be configured to implement determined driving maneuvers. The one or more automated driving modules 860 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 860 can be configured to execute various vehicle functions and/or to transmit data to, receive data from, interact with, and/or control the vehicle 800 or one or more systems thereof (e.g., one or more of vehicle systems 840). For example, functions and/or operations of an automotive navigation system can be realized by the one or more automated driving modules 860.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-8, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component (e.g., a central processing unit (CPU), a graphics processing unit (GPU), a field-programmable gate array (FPGA), or the like) that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:

a processor; and a memory storing:

a weight determination module including instructions that, when executed by the processor, cause the processor to determine from responses, from a human subject, to questions about preferences about a manner of a performance of a change of a movement of an automated vehicle, a weight for a rule that governs the manner, wherein the weight is a weight valuation from a weight valuations set having an initial value that is a quotient of one divided by a count of weight valuations in the weight valuations set;

a perception module including instructions that, when executed by the processor, cause the processor to determine an existence of a reason to cause the change of the movement of the automated vehicle;

a rule production module including instructions that, when executed by the processor, cause the processor to produce the rule with the weight applied, the rule comprising:

a first subrule for a preference, and a second subrule for a safety; and an implementation module including instructions that, when executed by the processor, cause, in response to the existence of the reason, information about the rule to be communicated to an actuator to cause the change of the movement of the automated vehicle in accordance with the rule.

2. The system of claim 1, wherein the preference is with respect to at least one of:

a degree of comfort of the human subject during the performance of the change of the movement of the automated vehicle, or a degree of vehicle performance of the automated vehicle during the performance of the change of the movement of the automated vehicle.

3. The system of claim 1, wherein the memory further stores:

a presentation module including instructions that, when executed by the processor, cause the processor to cause the questions to be presented to the human subject; and a reception module including instructions that, when executed by the processor, cause the processor to receive the responses.

4. The system of claim 3, wherein:

the instructions to cause the questions to be presented to the human subject, the instructions to receive the responses, and the instructions to determine the weight for the rule are configured to be performed before the human subject causes the automated vehicle to be operated on a public road.

5. The system of claim 3, wherein:

the implementation module further includes instructions that, when executed by the processor, cause the processor to cause, before a determination of the weight for the rule, the performance of the change of the movement of the automated vehicle in a specific manner, and wherein:

the instructions to cause the questions to be presented to the human subject, the instructions to receive the responses, and the instructions to determine the weight for the rule are configured to be performed in response to the performance of the change of the movement of the automated vehicle in the specific manner.

6. The system of claim 3, wherein:
the processor comprises a first processor and a second processor,
the first processor is disposed on the automated vehicle,
the second processor is disposed on a computing device, the computing device being separate from the automated vehicle,
the memory comprises a first memory and a second memory,
the first memory is disposed on the automated vehicle,
the second memory is disposed on the computing device,
the instructions to cause the questions to be presented to the human subject include instructions to cause the second processor to cause the questions to be presented to the human subject,
the instructions to receive the responses include instructions to cause the second processor to receive the responses,
the instructions to determine the weight for the rule include instructions to cause the second processor to determine the weight for the rule,
the instructions to determine the existence of the reason to cause the change include instructions to cause the first processor to determine the existence of the reason to cause the change,
the instructions to produce the rule with the weight applied include instructions to cause the first processor to produce the rule with the weight applied,
the instructions to cause the change of the movement of the automated vehicle include instructions to cause the first processor to cause the change of the movement of the automated vehicle,
the second memory stores a computing device communications module including instructions that, when executed by the second processor, cause the second processor to cause the weight for the rule to be transmitted to the automated vehicle, and
the first memory stores an automated vehicle communications module including instructions that, when executed by the first processor, cause the first processor to receive the weight for the rule.

7. The system of claim 3, wherein:
a question, of the questions, comprises a pairwise comparison question,
the pairwise comparison question comprises a pair of options,
the pair of options comprises a first option and a second option,
the first option is about a first manner of the performance of the change of the movement of the automated vehicle,
the second option is about a second manner of the performance of the change of the movement of the automated vehicle, and
a response, of the responses, to the pair of options comprises one of the first option and the second option.

8. The system of claim 7, wherein the instructions to cause the pairwise comparison question to be presented to the human subject include instructions to cause occurrences of:
a simulation of the first manner of the performance of the change of the movement of the automated vehicle, and
a simulation of the second manner of the performance of the change of the movement of the automated vehicle.

9. The system of claim 1, wherein:
the questions, about the preferences about the manner of the performance of the change of the movement of the automated vehicle, are selected, using a greedy technique, from a question set,
the greedy technique comprises performing, in an iterative manner until at least one of:
a count of the questions in the question set is zero,
a count of iterations is greater than a predefined limit of a number of the questions to be presented to the human subject, or
a posterior distribution of the weight valuations set is greater than a threshold:
determining, from the questions in the question set and based on members of a set of question-answer tuples associated with the question set, a specific question that has a maximum expected information gain over the weight valuations,
removing, from the question set, the specific question,
receiving a specific response to the specific question,
producing an adjustment of the set of question-answer tuples to reflect a selection of a question-answer tuple that includes the specific question and the specific response,
producing an update of the posterior distribution of the weight valuations set to reflect the adjustment of the set of question-answer tuples, and
determining, based on the update of the posterior distribution of the weight valuations set and for this iteration, a most-likely valuation of the weight from the weight valuations set.

10. The system of claim 9, wherein the weight valuation is determined from an intersection of a unit norm ball and a positive quadrant.

11. The system of claim 9, wherein the maximum expected information gain over the weight valuations is a function of an entropy of a random variable that represents a weight valuation of the human subject.

12. The system of claim 9, wherein the maximum expected information gain over the weight valuations is a function of the predefined limit of the number of the questions to be presented to the human subject.

13. The system of claim 9, wherein the producing the update of the posterior distribution of the weight valuations set comprises producing, using Bayes' Rule, the update of the posterior distribution of the weight valuations set.

14. The system of claim 1, wherein:
the instructions to cause the change of the movement of the automated vehicle include instructions to cause a first signal to be transmitted to a control stage of an autonomous motion technology system of the automated vehicle,
the first signal includes the information about the rule, and
the control stage is configured to:
transmit a second signal to the actuator configured to cause the movement of the automated vehicle, and
receive a third signal from a sensor configured to determine a measurement of a variable associated with the movement of the automated vehicle so that the movement of the automated vehicle occurs in accordance with the rule.

15. The system of claim 14, wherein the variable comprises at least one of a speed of the automated vehicle, an acceleration of the automated vehicle, a jerk of the automated vehicle, a distance between the automated vehicle and an object, a longitudinal distance between a longitudinal axis of the automated vehicle and the object, or a lateral distance between the longitudinal axis of the automated vehicle and the object.

16. The system of claim 14, wherein, in accordance with the rule, the measurement of the variable is a function of a measurement of another variable.

17. A method, comprising:

determining, by a processor and from responses, from a human subject, to questions about preferences about a manner of a performance of a change of a movement of an automated vehicle, a weight for a rule that governs the manner, wherein the weight is a weight valuation from a weight valuations set and a posterior distribution of the weight valuations set having an initial value that is a quotient of one divided by a count of weight valuations in the weight valuations set;

determining, by the processor, an existence of a reason to cause the change; change of the movement of the automated vehicle;

producing, by the processor, the rule with the weight applied, the rule comprising:

a first subrule for a preference, and a second subrule for a safety; and causing, by the processor and in response to the existence of the reason, information about the rule to be communicated to an actuator to cause the change of the movement of the automated vehicle in accordance with the rule.

18. The method of claim 17, wherein the automated vehicle is an autonomous vehicle.

19. The method of claim 17, wherein the rule is expressed using weighted signal temporal logic.

20. A non-transitory computer-readable medium for determining a weight for a rule that governs a manner of a performance of a change of a movement of an automated vehicle, the non-transitory computer-readable medium including instructions that, when executed by one or more processors, cause the one or more processors to:

determine from responses, from a human subject, to questions about preferences about the manner of the performance of the change of the movement of the automated vehicle, the weight for the rule that governs the manner, wherein the weight is a weight valuation from a weight valuations set and a posterior distribution of the weight valuations set having an initial value that is a quotient of one divided by a count of weight valuations in the weight valuations set;

determine an existence of a reason to cause the change of the movement of the automated vehicle;

produce the rule with the weight applied, that governs the manner of the performance of the change of the movement of the automated vehicle, the rule comprising:

a first subrule for a preference, and a second subrule for a safety; and cause, in response to the existence of the reason, information about the rule to be communicated to an actuator to cause the change of the movement of the automated vehicle in accordance with the rule.

* * * * *